(12) United States Patent
Sung et al.

(10) Patent No.: US 6,258,141 B1
(45) Date of Patent: Jul. 10, 2001

(54) SOL-GEL ALUMINA ABRASIVE GRAIN

(75) Inventors: Jason Sung, Northborough, MA (US); Ralph Bauer, Niagara Falls (CA)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/592,157

(22) Filed: Jun. 12, 2000

Related U.S. Application Data

(63) Continuation-in-part of application No. 09/378,419, filed on Aug. 20, 1999, now abandoned.

(51) Int. Cl.$^7$ .............................. C09K 3/14; B24D 3/00; B24D 3/14
(52) U.S. Cl. .................... 51/309; 51/293; 51/307
(58) Field of Search ............................. 51/293, 307, 308, 51/309; 428/403, 404

(56) References Cited

U.S. PATENT DOCUMENTS

| | | | |
|---|---|---|---|
| 4,997,461 | * | 3/1991 | Markhoff-Matheny et al. ...... 51/293 |
| 5,131,926 | * | 7/1992 | Rostoker et al. ...................... 51/309 |
| 5,213,591 | * | 5/1993 | Celikkaya et al. .................... 51/309 |
| 5,474,583 | * | 12/1995 | Celikkaya ............................. 51/309 |
| 5,653,775 | * | 8/1997 | Plovnick et al. ...................... 51/309 |
| 6,048,577 | * | 4/2000 | Garg ....................................... 106/3 |
| 6,080,216 | * | 6/2000 | Erickson ............................... 51/309 |

* cited by examiner

*Primary Examiner*—Michael Marcheschi
(74) *Attorney, Agent, or Firm*—David Bennett

(57) ABSTRACT

Coating a sol-gel alumina abrasive grit with a ceramic oxide reduces the surface area of the grit and allows the production of vitreous bonded products using low temperature vitreous bond materials without the production of black spots as a result of the incomplete combustion of organic components used in the production process.

6 Claims, 2 Drawing Sheets

36 Grit  54 Grit  80 grit

SOL-GEL ALUMINA ABRASIVE GRAIN

CROSS REFERENCE TO RELATED APPLICATION

This application is a continuation-in-part of Ser. No. 09/378,419, filed Aug. 20, 1999, now abandoned.

BACKGROUND OF THE INVENTION

The present invention concerns sol-gel alumina abrasive grits and particularly abrasive grits that are intended for incorporation in bonded abrasives.

Sol-gel alumina abrasive grits, particularly those that have an alumina crystal size that is essentially sub-micron are extremely effective in many applications especially when incorporated in vitreous bonded abrasive wheels. In the production of such wheels, the grits are mixed with a vitreous bond material and various organic temporary binders, burnout materials and/or lubricants and the mixture is placed in a mold. The temporary binders and/or lubricants are needed to facilitate the mixing and molding operation and the burnout materials are needed to ensure that the wheel has a desired degree of porosity when completed. The burnout material is of course intended to be completely removed during the firing of the wheel.

During the production process the temperature of the mixture is raised to the point at which the bond components mix, (if a raw bond is used), and flow until the abrasive grits are coated with the vitreous bond material and the molten bond forms a bond post connecting the points on adjacent grits that contact or are in close proximity. After allowing the maturing of the bond post structures, the temperature is allowed to ramp down until the wheel can be removed from the mold.

The temperature at which the bond is fired is rather critical because it is found that sol-gel alumina abrasive grits with alumina crystal sizes of the order of one micron or less are deteriorated by exposure to temperatures higher than about 1150° C. for the prolonged periods required for formation of a vitreous bonded wheel. This is because the very fine crystal structure, which is closely connected to the excellent grinding performance, begins to be coarsened. For this reason it is strongly recommended that, when using sol-gel alumina abrasive grits, particularly with seeded sol-gel alumina abrasive grits, a bond should be used that is matured at a temperature below 1150° C. and preferably below about 1000° C.

In addition, the higher the temperature at which the bond is formed, the greater the extent of the penetration of the abrasive grits by silica from the vitreous bond system. This interaction, while not a serious problem with low temperature-matured bonds, is something that needs to be considered in developing optimum performance.

It is found however that, using such low temperature-matured vitreous bond materials, the organic materials that are supposed to be completely burned out in fact leave a residue of carbon. This residue collects in surface pores on the grits, which are typically white or colorless, such that the wheel produced may have black spots.

A process has now been developed that permits the use of low temperature vitreous bonds with sol-gel alumina abrasive grits without the development of the unsightly blemishes, or black spots, on the surface of the vitreous bonded product.

The process has also been found to have a beneficial effect on reducing the interaction between the bond and the abrasive grits thereby allowing the development of stronger bonds.

DESCRIPTION OF THE INVENTION

The present invention provides a coated sol-gel alumina abrasive grit in which the alumina grits are coated with a ceramic oxide and comprise crystals of alpha alumina that are two microns or smaller in size.

By the term "coated" is meant that the alpha alumina abrasive grits have been treated with a solution of a precursor of the ceramic oxide and then calcined at a temperature sufficient to drive off the solvent in which the precursor was dissolved and to form the ceramic oxide from the precursor. In practice the most usual effect is for the ceramic oxide to diffuse into the surface layer of the grit and reduce the porosity of the abrasive grit. This reduction can be by as much as 50%, though more commonly the surface area reduction is found to be from about 10% to 40%. The "surface area" as the term is used herein is understood to refer to the surface area as measured by the BET (Breuner, Emmet, Teller) equation and method. In some cases there is evidence that the ceramic oxide reacts, at least in part, with the alumina to form an aluminate, (which would include spinels in the case of certain oxides such as magnesium oxide). For the purposes of this invention such aluminates, where formed, are considered to be ceramic oxides, except for the purpose of calculating the amount of the ceramic oxide added when the ceramic oxide in the highest oxidation state is used as the calculation basis.

The invention therefore also provides a process for the production of sol-gel alumina abrasive grit which comprises forming alpha alumina abrasive grits with a crystal size of about 2 microns or less and then treating the grits with a solution or dispersion of a ceramic oxide precursor and subsequently heating the treated grits at a temperature sufficient to drive off the solvent and convert the precursor to a ceramic oxide.

The temperature of the treatment is preferably from 900 to 1300° C. and more preferably from 1000 to 1200° C. though higher or lower temperatures can be used provided that the alumina crystal size is not materially altered and providing the ceramic oxide is formed. It is also highly preferred that the temperature should be high enough to result in the BET surface area of the treated grits being reduced as indicated above.

The ceramic oxide precursor is preferably a salt that is soluble in water and which, upon heating, decomposes to the oxide and gases with no residual material. The salt can be for example a nitrate of an organic acid salt. The ceramic oxide itself is understood to refer to a metal oxide stable at temperatures over 1500° C. Typical examples include magnesium oxide, titanium dioxide, cobalt oxide, nickel oxide and chromium oxide. As indicated above the ceramic oxide may be in the form of the corresponding aluminates where these are formed by reaction of the oxide with the alumina. The amount of the ceramic oxide added is sufficient to provide up to one percent by weight, (measured as the oxide), of the total alumina grit weight.

The ceramic oxide may be added, as indicated above, as an aqueous solution of a soluble salt that yields the oxide when heated to temperatures to which the treated grain is above about at which alumina is exposed during processing. Alternatively and often preferably the ceramic oxide salt is dissolved or dispersed in a dispersion or sol of an alpha alumina precursor such as for example a boehmite sol or an aqueous dispersion of alumina trihydrate. This mode of addition can also place a layer of an alpha alumina or an alpha alumina precursor such as gamma alumina around the abrasive grits. More usually however the bulk of the alumina reacts to form an aluminate. This coating or layer also adds protection for the grits against attack from a vitreous bond when the grits are used to make vitreous bonded materials.

The sol-gel alumina from which the abrasive grits are made is preferably a seeded sol-gel alumina with a submicron crystal size. In the context of this invention, the crystal size is measured by the "intercept method" in which an SEM micrograph is analyzed by tracing a plurality of diagonal lines across the micrograph and dividing the total length of the lines by the number of crystals crossed by the lines and then multiplying the value obtained by a correction factor of 1.5.

DRAWINGS

DESCRIPTION OF PREFERRED EMBODIMENTS

Figure 1:
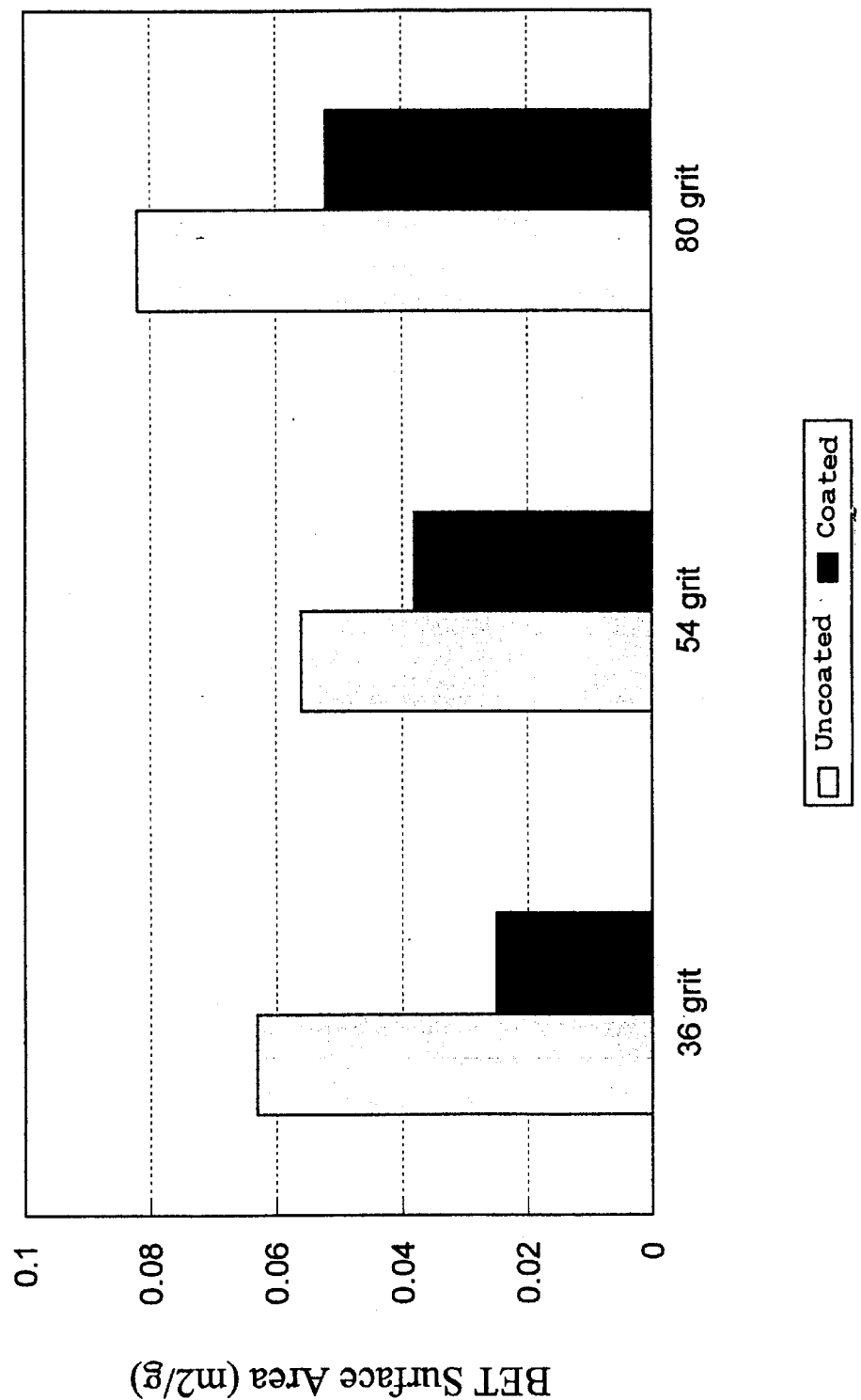
FIG. 1 is a bar graph showing the BET surface areas for coated and uncoated grains at three different grit sizes.

The invention is now illustrated with reference to the following non-limiting Example.

EXAMPLE 1

In this Example we describe the production of a vitreous bonded abrasive article comprising seeded sol-gel alumina abrasive grits, a vitreous bond that is matured at a temperature of 950° C. and organic burnout materials comprising pore-formers, lubricants and temporary binders. Two sets of sample were prepared with the identical formulations except that the sample made according to the invention comprising abrasive grit that had been soaked in a solution of cobalt nitrate and then calcined to give a coated abrasive grit according to the invention.

Preparation of Coated Abrasive Grit

Abrasive grain which is sold by Saint-Gobain Industrial Ceramics, Inc. under the trade name "Cerpass-XTL" was used as the sol-gel alumina abrasive grain in all the following Examples. This is a seeded sol-gel alumina comprising at least 98% of alpha alumina and a Vickers hardness of about 21 Gpa. To secure a sample of a coated grain according to the invention, a 1000 gm sample of the grain in a 54 grit size was placed in a Hobart mixer and a solution of cobalt nitrate was added. The amount of the solution was calculated to give a cobalt aluminate content in the final grain of 0.25%, measured as cobalt oxide, and to this end the calculated amount of cobalt nitrate hexahydrate that would need to be added was 4.1 gm. This was added in the form of 10 gm of an aqueous solution which had a pH of about 2.0. As will be obvious the amount of the coating ceramic oxide precursor will depend on the grit size since the smaller grits present a larger surface area to be coated. It is calculated for example that, to achieve the same level of coating on the grain surface for a 36 grit grain, the amount of the ceramic oxide precursor can be decreased by 15% but it should be increased by 10% if the grit size is 80.

The mixing conditions are adjusted to give a uniform coating and this can be determined usually by visual inspection where the precursor solution has an intense color. After uniform coating has been achieved the coated grain was then dried in a convection oven at 100° C. over 18 hours. If the mixer is fitted with a dryer the drying can be carried out in the mixer of course. With cobalt nitrate, the melting point is only 55° C. and this is in fact desirable since it aids in ensuring uniform distribution over the grain surface. Completion of the drying was indicated by a flowable grain with a uniform color. Overdrying is not recommended since this can lead to flaking or powdering of the coating. The objective is not to lose the water of hydration at this stage since this could lead to further degradation of the nitrate and the drying oven is not usually adapted for removal of NOx fumes.

The dried coated grain is then placed in a kiln and fired. The kiln used was a rotary kiln with the hot zone at 1100° C. and using a 20 minute residence time. Alternatively a static firing kiln can be used in which the grains are ramped up to a temperature of 1050–1150° C. and held there for about 15 minutes before cooling down to room temperature. The grain initially turned black indicating the formation of cobalt oxide (between about 200 to 900° C.) which changed to a blue color indicating the formation of cobalt aluminate above 900° C.

Testing of the Coated Grain

The BET surface areas of coated grains, prepared as indicated above, in grit sizes of 36, 54 and 80 were then compared with identical untreated grain. At all grit sizes there was a significant reduction of up to 40% in the measured surface area as a result of the coating. The results are shown in FIG. 1.

Comparison testing of the coated and uncoated grains indicated that the coating had no adverse effect on hardness, electrostatic projectability, or elementdiffusion-profile across the grain/bond interface in vitrified bonded products. The crystal size of the alumina showed a minor increase of from 0.01 to 0.02 micrometer.

Preparation of Vitreous Bonded Samples

Figure 2:
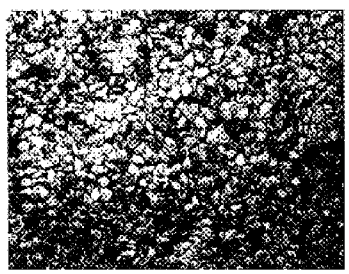
FIG. 2 is a series of photographs showing the prevalence of black spots in vitreous bonded materials made using uncoated grain.
Figure 2:
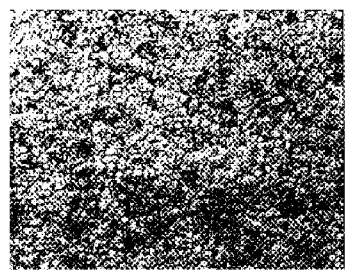
Figure 2:
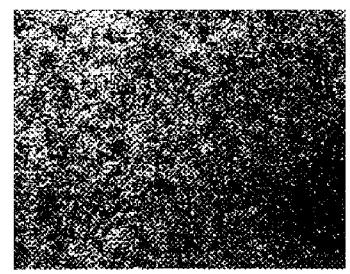
Figure 2:
Figure 2:
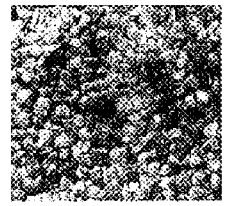
Figure 2:
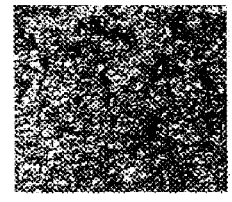

The coated grain prepared as above was then compared against an uncoated grain that was otherwise identical in the formation of vitreous bonded test bars. The bond used was a low temperature bond that was matured at a temperature of 900° C. for 10 hours. The uncoated grain showed significant numbers of black spots. These are shown clearly in FIG. 2. The coated showed no black spots. This correlation with the reduction in surface area is strong support for the conclusion that the black spots are the result of the collection of incompletely combusted organic material in surface pores of a grain.

The test bars were then subjected to tests to determine the MOR strength and the sand blast penetration for bars made using coated and uncoated grains. No significant difference was observed. If anything the bars made with coated grain were slightly better.

The coated grain was then formed into a test bar with an equal volume of white fused aluminum oxide using a transparent vitreous bond matured at 950° C. over a ten hour period. No "bleeding" of the color of the coated grain into the fused alumina grain was detected showing that the coating was fully integrated into the surface of the grain.

EXAMPLE 2

In this Example the same procedures were adopted as set forth in Example 1 with the difference that the cobalt salt was added to a boelimite sol and the amount added was sufficient to result, after firing at the temperatures used in Example 1, in the deposition on the abrasive grits of 1.00% by weight of cobalt, measured as cobalt oxide, in the form of a layer comprising cobalt aluminate and an alpha alumina precursor. The abrasive grits this produced were very resistant to color changes even after the prolonged firing schedules required to form a vitreous bonded abrasive product. Measurement of the surface area of the grits before and after the formation of the coating indicated a reduction of the surface area by well over 10%.

What is claimed is:

1. A coated sol-gel alpha alumina abrasive grit comprising crystals of alpha alumina that are two microns or smaller in size coated with up to one percent by weight, based on the weight of the abrasive grit, of a ceramic oxide selected from the group consisting of magnesium oxide; titanium oxide; cobalt oxide; nickel oxide; chromium oxide; the corresponding aluminates of these oxides; mixtures of one or more of such oxides, and aluminates and an alpha alumina precursor; and mixtures thereof wherein the coated grit has a BET surface area that is 10–40% lower than the BET surface area of the grit before it is coated.

2. A coated abrasive grit according to claim 1 in which the alumina is a seeded sol-gel alumina.

3. A coated abrasive grit according to claim 1 in which the coating comprises cobalt aluminate.

4. A vitreous bonded abrasive product in which the abrasive grains present comprises a coated abrasive grit according to claim 1.

5. A vitreous bonded abrasive product in which the abrasive grains present comprises a coated abrasive grit according to claim 2.

6. A vitreous bonded abrasive product in which the abrasive grains present comprises a coated abrasive grit according to claim 3.

* * * * *